US008625888B2

(12) United States Patent
Sun et al.

(10) Patent No.: US 8,625,888 B2
(45) Date of Patent: Jan. 7, 2014

(54) VARIABLE KERNEL SIZE IMAGE MATTING

(75) Inventors: Jian Sun, Beijing (CN); Kaiming He, Beijing (CN)

(73) Assignee: Microsoft Corporation, Redmond, WA (US)

( * ) Notice: Subject to any disclaimer, the term of this patent is extended or adjusted under 35 U.S.C. 154(b) by 469 days.

(21) Appl. No.: 12/841,133

(22) Filed: Jul. 21, 2010

(65) Prior Publication Data

US 2012/0020554 A1    Jan. 26, 2012

(51) Int. Cl.
*G06K 9/34* (2006.01)
*G06K 9/66* (2006.01)

(52) U.S. Cl.
USPC .......................................... 382/164; 382/195

(58) Field of Classification Search
USPC ........................... 382/164, 195; 345/592–593
See application file for complete search history.

(56) References Cited

U.S. PATENT DOCUMENTS

| | | | |
|---|---|---|---|
| 5,671,294 A * | 9/1997 | Rogers et al. ................ | 382/228 |
| 6,130,676 A | 10/2000 | Wise et al. | |
| 6,134,345 A | 10/2000 | Berman et al. | |
| 6,226,000 B1 | 5/2001 | Richens et al. | |
| 6,791,573 B2 | 9/2004 | Hamburg | |
| 7,280,117 B2 | 10/2007 | Fayan | |
| 7,400,763 B2 | 7/2008 | Hamburg | |
| 7,420,590 B2 | 9/2008 | Matusik et al. | |
| 7,430,339 B2 | 9/2008 | Rother et al. | |
| 7,627,168 B2 | 12/2009 | Hamburg | |
| 7,636,128 B2 | 12/2009 | Sun et al. | |
| 7,692,664 B2 * | 4/2010 | Weiss et al. .................... | 345/592 |
| 2002/0149686 A1 * | 10/2002 | Taubman ....................... | 348/272 |
| 2006/0029275 A1 | 2/2006 | Li et al. | |
| 2006/0221248 A1 | 10/2006 | McGuire et al. | |
| 2007/0013813 A1 * | 1/2007 | Sun et al. ....................... | 348/587 |
| 2007/0070226 A1 | 3/2007 | Matusik et al. | |
| 2007/0165966 A1 | 7/2007 | Weiss et al. | |
| 2007/0263119 A1 | 11/2007 | Shum et al. | |
| 2008/0317388 A1 | 12/2008 | Hamburg | |
| 2009/0097728 A1 | 4/2009 | Lee et al. | |
| 2009/0278859 A1 | 11/2009 | Weiss et al. | |
| 2010/0030778 A1 * | 2/2010 | Liu et al. ........................... | 707/6 |
| 2011/0038536 A1 | 2/2011 | Gong | |
| 2011/0216976 A1 | 9/2011 | Rother et al. | |
| 2011/0293247 A1 | 12/2011 | Bhagavathy et al. | |

(Continued)

FOREIGN PATENT DOCUMENTS

| | | |
|---|---|---|
| CN | 101536078 | 9/2009 |
| CN | 101588459 | 11/2009 |

OTHER PUBLICATIONS

Office Action for U.S. Appl. No. 12/841,094, mailed on Feb. 3, 2012, Jian Sun, "Interactive Image Matting", 9 pgs.

(Continued)

*Primary Examiner* — Amara Abdi
(74) *Attorney, Agent, or Firm* — Lee & Hayes, PLLC

(57) ABSTRACT

Image matting is performed on an image having a specified foreground region, a background region and an unknown region by selecting a kernel size based on a size of the unknown region. The matting processing is performed using the selected kernel size to provide an alpha matte that distinguishes a foreground portion from a background portion in the unknown region. Further, in some implementations, a trimap of the image may be segmented and matting processing may be performed on each segment using a kernel size appropriate for that segment.

17 Claims, 12 Drawing Sheets

200

(56) References Cited

U.S. PATENT DOCUMENTS

| | | | |
|---|---|---|---|
| 2012/0008862 A1* | 1/2012 | Das Gupta et al. | 382/167 |
| 2012/0020554 A1 | 1/2012 | Sun et al. | |
| 2012/0128070 A1* | 5/2012 | Kim et al. | 375/240.13 |

OTHER PUBLICATIONS

Bai, et al., "A Geodesic Framework for Fast Interactive Image and Video Segmentation and Matting", retrieved on Apr. 20, 2010 at <<http://webdocs.cs.ualberta.ca/~jag/papersVis2/07ICCV/data/papers/ICCV/094.pdf>>, IEEE International Conference on Computer Vision (ICCV), Rio De Janeiro, BR, 2007, pp. 1-8.

Borodajkewycz, "Tomorrow's Photoshop Effects", retrieved on Apr. 20, 2010 at <<http://forum.artoolkit.org/courses/Seminar/WS2009/Tomorrows_PhotoShop_Effects.pdf>>, Technische Universitat, Wien, Austria, Report at Seminar on Computer Graphics, 2009, pp. 1-18.

Bousseau, et al., "User-Assisted Intrinsic Images", retrieved on Apr. 21, 2010 at <<http://artis.imag.fr/Publications/2009/BPD09/intrinsic_main.pdf>>, ACM, Transactions on Graphics (TOG), vol. 28, No. 5, Dec. 2009, pp. 1-10.

Chang, et al., "An Iterative Bayesian Approach for Digital Matting", retrieved on Apr. 21, 2010 at <<http://ieeexplore.ieee.org/stamp/stamp.jsp?tp=&arnumber=1699162>>, IEEE Computer Society, 18th International Conference on Pattern Recognition (ICPR), Hong Kong, vol. 2, 2006, pp. 122-125.

Chuang, et al., "A Bayesian Approach to Digital Matting", retrieved on Apr. 20, 2010 at <<http://citeseerx.ist.psu.edu/viewdoc/download?doi=10.1.1.8.2400&rep=rep1&type=pdf>>, IEEE Proceedings of Computer Vision and Pattern Recognition (CVPR), vol. II, Dec. 2001, pp. 264-271.

Chuang, et al., "Video Matting of Complex Scenes", ACM, Proceedings of the 29th Annual Conference on Computer Graphics and Interactive Techniques, Session: Images and Video, 2002, pp. 243-248.

Crow, "Summed-Area Tables for Texture Mapping", retrieved on Apr. 20, 2010 at <<http://citeseerx.ist.psu.edu/viewdoc/download-?doi=10.1.1.124.1904&rep=rep1&type=pdf>>, ACM, Computer Graphics, vol. 18, No. 3, Jul. 1984, pp. 207-212.

Elder, et al., "Image Editing in the Contour Domain", IEEE Transactions on Pattern Analysis and Machine Intelligence, vol. 23, Issue 3, Mar. 2001, pp. 291-296.

Farbman, et al., "Edge-Preserving Decompositions for Multi-Scale Tone and Detail Manipulation", retrieved don Apr. 21, 2010 at <<http://www.cs.huji.acil/~danix/epd/epd-small.pdf>>, ACM, International Conference on Computer Graphics and Interactive Techniques (CCGIT), Los Angeles, CA, vol. 27, No. 3, 2008, pp. 67-77.

Fattal, et al., "Edge-Based Image Coarsening", retrieved on Apr. 21, 2010 at <<http://vis.berkeley.edu/papers/ebic/ebic_manuscript.pdf>>, ACM, Transactions on Graphics (TOG), vol. 29, No. 1, Dec. 2009, pp. 1-20.

Fattal, et al., "Gradient Domain High Dynamic Range Compression", ACM, Proceedings of the 29th Annual Conference on Computer Graphics and Interactive Techniques Session: Images and Video, 2002, pp. 249-256.

Finlayson, et al., "Removing Shadows From Images", Computer Vision—ECCV 2002: 7th European Conference on Computer Vision, May 28-31, 2002, pp. 129-132.

Zheng, et al., "Learning Based Digital Matting", retrieved on Apr. 20, 2010 at <<http://zheng.vision.googlepages.com/matting_iccv09_Zheng.pdf>>, IEEE 20th International Conference on Computer Vision (ICCV), Kyoto, Japan, 2009, pp. 1-8.

Grady, et al., "Random Walks for Interactive Alpha-Matting", retrieved on Apr. 20, 2010 at <<http://citeseerx.ist.psu.edu/viewdoc/download?doi=10.1.1.94.5802&rep=rep1&type=pdf>>, Proceedings of Visualization Imaging and Image Processing (VIIP), Benidorm, Spain, 2005, pp. 423-429.

Guan, et al., "Easy Matting—A Stroke Based Approach for Continuous Image Matting", retrieved on Apr. 21, 2010 at <<http://www.cad.zju.edu.cn/home/chenwei/research/EG2006_paper.pdf>>, The Eurographics Association and Blackwell Publishing, Proceedings of Eurographics, vol. 25, No. 3, 2006, pp. 567-576.

Hasinoff, et al., "Boundary matting for view synthesis", retrieved on Apr. 20, 2010 at <<http://research.microsoft.com/pubs/64217/Hasinoff-CVIU06.pdf>>, Elsevier Science Inc., Computer Vision and Image Understanding, vol. 103, No. 1, 2006, pp. 22-32.

He, et al., "Fast Matting Using Large Kernel Matting Laplacian Matrices", retrieved on Apr. 20, 2010 at <<http://research.microsoft.com/en-us/um/people/jiansun/papers/CVPR10_FastMatting.pdf>>, IEEE Conference on Computer Vision and Pattern Recognition (CVPR). San Francisco, CA, 2010, pp. 1-8.

He, et al., "Single Image Haze Removal Using Dark Channel Prior", retrieved on Apr. 21, 2010 at <<http://research.microsoft.com/en-us/um/people/jiansun/papers/dehaze_cvpr2009.pdf>>, IEEE Conference on Computer Vision and Pattern Recognition (CVPR), Miami, FL, 2009, pp. 1956-1963.

Hillman, et al., "Alpha Channel Estimation in High Resolution Images and Image Sequences" Proceedings of the 2001 IEEE Computer Society Conference on Computer Vision and Pattern Recognition, vol. 1, 2001, pp. I-1063-I-1068.

Hsu, et al., "Light Mixture Estimation for Spatially Varying White Balance", retrieved on Apr. 21, 2010 at <<http://www.shaiavidan.org/papers/ime-sig2008-sm.pdf>>, ACM, International Conference on Computer Graphics and Interactive Techniques, Los Angeles, CA, vol. 27, No. 3, 2008, pp. 1-7.

Levin, et al., "A Closed Form Solution to Natural Image Matting", retrieved on Apr. 20, 2010 at <<http://www.wisdom.weizmann.ac.il/~levina/papers/Matting-Levin-Lischinski-Weiss-CVPR06.pdf>>, IEEE Conference on Computer Vision and Pattern Recognition (CVPR), New York, NY, vol. 1, Jun. 2006, pp. 61-68.

Levin, et al., "Colonization using Optimization", retrieved on Apr. 21, 2010 at <<http://www.wisdom.weizmann.ac.il/~levina/papers/colorization-siggraph04.pdf>>, ACM, Transactions on Graphics (TOG), vol. 23, No. 3, 2004, pp. 689-694.

Liu, et al., "Paint Selection", retrieved on Apr. 20, 2010 at <<http://research.microsoft.com/en-us/um/people/jiansun/papers/paintselection_siggraph09.pdf>>, ACM Transactions on Graphics (TOG), vol. 28, No. 3, Aug. 2009, pp. 1-7.

Mitsunaga, et al., "AutoKey: Human Assisted Key Extraction", ACM, Proceedings of the 22nd Annual Conference on Computer Graphics and Interactive Techniques, 1995, pp. 265-272.

Narasimhan, et al., "Interactive Deweathering of an Image Using Physical Models", IEEE Workshop on Color and Photometric Methods in Computer Vision, In Conjunction with ICCV, Oct. 2003, 8 pgs.

Perez, et al., "Poisson Image Editing", retrieved on Apr. 21, 2010 at <<http://citeseerx.ist.psu.edu/viewdoc/download?doi=10.1.1.133.6932&rep=rep1&type=pdf>>, ACM, Transactions on Graphics (TOG), vol. 22, No. 3, 2003, pp. 313-318.

Perona, et al., "Scale-Space and Edge Detection Using Anisotropic Diffusion", UC Berkeley EECS Technical Reports, Dec. 20, 1988, Also, IEEE Transactions on Pattern Analysis and Machine Intelligence, vol. 12, Issue 7, Jul. 1990, pp. 629-639, 41 pgs.

Qian, et al., "Video Background Replacement Without a Blue Screen", Proceedings 1999 International Conference on Image Processing, vol. 4, Oct. 24-28, 1999, pp. 143-146.

Rhemann, et al., "A Perceptually Motivated Online Benchmark for Image Matting", retrieved on Apr. 21, 2010 at <<http://www.juew.org/publication/CVPR09_evaluation_final_HQ.pdf>>, IEEE Proceedings on Computer Vision and Pattern Recognition (CVPR), 2009, pp. 1-8.

Rhemann, et al., "Alpha Matting Evaluation Website", retrieved on Apr. 20, 2010 at <<http://www.alphamatting.com>>, IEEE Conference on Computer Vision and Pattern Recognition (CVPR), Jun. 2009, pp. 1-2.

Rhemann, et al., "High Resolution Matting via Interactive Trimap Segmentation", retrieved on Apr. 20, 2010 at <<http://www.ims.tuwien.ac.at/media/documents/publications/RhemannRother-RavAchaSharpTR08.pdf>>, Technical Report TR-188-2-2008-04, IEEE Conference on Computer Vision and Pattern Recognition (CVPR), Alaska, Jun. 2008, pp. 1-12.

(56) References Cited

OTHER PUBLICATIONS

Rhemann, et al., "Improving Color Modeling for Alpha Matting", retrieved on Apr. 21, 2010 at <<http://publik.tuwien.ac.at/files/PubDat_169054.pdf>>, British Machine Vision Conference (BMVC), 2008, pp. 1-10.

Ruzon, et al., "Alpha Estimation in Natural Images", retrieved on Apr. 20, 2010 at <<http://www.cs.duke.edu/~tomasi/ papers/ruzon/ruzonCvpr00.pdf>>, IEEE Conference on Computer Vision and Pattern Recognition (CVPR), vol. 1, Jun. 2000, vol. 1, pp. 18-25.

Saad, "Iterative Methods for Sparse Linear Systems", Second Edition, retrieved on Apr. 21, 2010 at <<http://www-users.cs.umn.edu/~saad/PS/iter1.pdf>>, CRC Press, Jan. 3, 2000.

Singaraju, et al., "New Appearance Models for Natural Image Matting", retrieved on Apr. 20, 2010 at <<http://research.microsoft.com/pubs/80300/cvpr09-matting-newModels.pdf>>, IEEE Conference on Computer Vision and Pattern Recognition (CVPR), Miami, FL, Jun. 2009, pp. 659-666.

Smith, et al., "Blue Screen Matting", ACM, Proceedings of the 23rd Annual Conference on Computer Graphics and Interactive Techniques, 1996, pp. 259-268.

Sun, et al., "Flash Matting", retrieved on Apr. 20, 2010 at <<http://vision.ai.uiuc.edu/~tankh/citations/nonphotorealistic_camera_siggraph2004/sun_siggraph2006.pdf>>, ACM, Transactions on Graphics (TOG), vol. 25, No. 3, Jul. 2006, pp. 772-778.

Sun, et al., "Poisson Matting", retrieved on Apr. 20, 2010 at <<http://citeseerx.ist.psu.edu/viewdoc/download?doi=10.1.1.102.8258&rep=rep1&type=pdf>>, ACM Transactions on Graphics, vol. 23, No. 3, Jul. 2004, pp. 315-321.

Szeliski, "Locally Adapted Hierarchical Basis Preconditioning", retrieved on Apr. 21, 2010 at <<http://research.microsoft.com/pubs/70280/tr-2006-38.pdf>>, ACM, Transactions on Graphics, International Conference on Computer Graphics and Interactive Techniques, vol. 25, No. 3, Aug. 2006, pp. 1135-1143.

Wang, et al., "An Iterative Optimization Approach for Unified Image Segmentation and Matting", retrieved on Apr. 20, 2010 at <<http://research.microsoft.com/en-us/um/people/cohen/iccv2005.pdf>>, IEEE Computer Society, Proceedings of the Tenth International Conference on Computer Vision (ICCV), vol. 2, 2005, pp. 936-943.

Wang, et al, "Image and Video Matting: A Survey", retrieved on Apr. 21, 2010 at <<http://www.nowpublishers.com/getpdf.aspx?doi=0600000019&product=CGV>>, Now Publishers Inc., Foundations and Trends in Computer Graphics and Vision, vol. 3, No. 2, 2007, pp. 97-175.

Wang, et al., "Interactive Video Cutout", retrieved on Apr. 20, 2010 at <<http://juew.org/publication/VideoCutout2005.pdf>>, ACM, International Conference on Computer Graphics and Interactive Techniques, Los Angeles, CA, 2005, pp. 585-594.

Wang, et al., "Optimized Color Sampling for Robust Matting", retrieved on Apr. 20, 2010 at <<http://research.microsoft.com/en-us/um/people/cohen/robustmattingcvprfinal.pdf>>, IEEE Proceedings of Conference on Computer Vision and Pattern Recognition (CVPR), Minneapolis, MN, Jun. 2007, pp. 1-8.

Wang, et al., "Soft Scissors : An Interactive Tool for Realtime High Quality Matting", retrieved on Apr. 20, 2010 at <<http://citeseerx.ist.psu.edu/viewdoc/download?doi=10.1.1.64.3777&rep=rep1&type=pdf>>, ACM, International Conference on Computer Graphics and Interactive Techniques, San Diego, CA, vol. 25, No. 3, 2007, pp. 1-6.

The Chinese Office Action mailed Mar. 8, 2013 for Chinese patent application No. 201110216315.6, a counterpart foreign application of US patent No. 8,386,964, 18 pages.

* cited by examiner

100

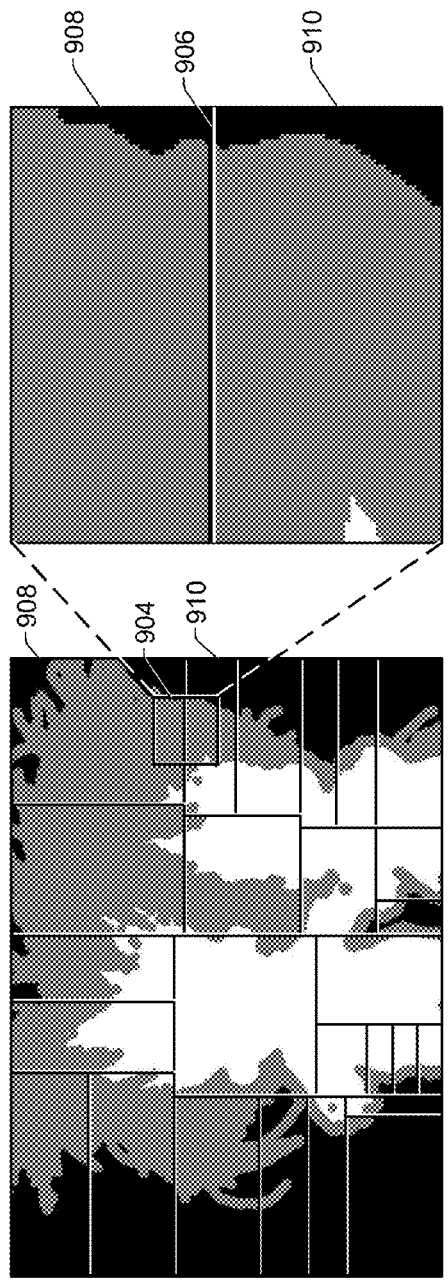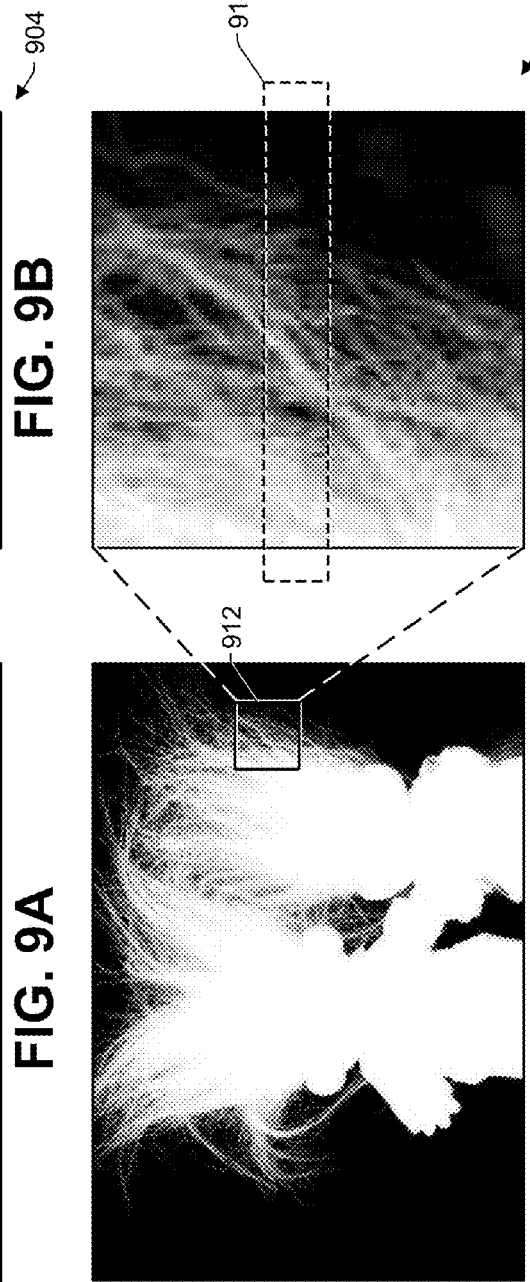

VARIABLE KERNEL SIZE IMAGE MATTING

BACKGROUND

In image composition, a composite image can be created by combining a portion of a first image with a portion of a second image. For example, a foreground portion of a first image, such as a person or thing, can be lifted from the first image and placed over a second image which serves as a new background in the composite image. In order to combine these image portions correctly an associated matte (e.g., an alpha matte) that contains the coverage information (e.g., the shape of one or more portions being composited) is used to distinguish between the image portions. This technique, referred to as "image matting" or just "matting", is common in still image compositing, video special effects, computer vision and a variety of other graphics and image-manipulation applications.

Well-known matting techniques include blue-screen or green-screen matting in which an alpha matte and foreground portion of an image can be readily separated from the background of the image because the background is a single user-controlled color. In contrast, for natural image matting in which the background is not a single color, the alpha matte, the foreground and the background are estimated and identified using statistical techniques. Further, natural image matting is an intrinsically under-constrained problem due to the number of unknowns in the matting equation. Consequently, separation of the alpha matte, the foreground and the background for a given image using conventional matting techniques can be quite computation intensive.

Further, because image matting is an under-constrained problem, most existing approaches rely on a "trimap" provided with an image or generated from the image that identifies at least some of a definite foreground, a definite background and/or an unknown region. A sufficiently defined trimap can assist in achieving a quality matte by reducing the number of unknown elements. Further, when matting is performed interactively by a user using a user interface, the capability of providing instant feedback to the user can be helpful because the user is able to refine the trimap as the matte is rendered until a satisfactory result is obtained. For example, providing real time feedback to a user can significantly shorten the overall matting process time and reduce user effort since the user is able to quickly identify locations where touchups are desired. Also, a highly responsive system can provide a more fluid user experience and avoid user frustration. Unfortunately, most conventional high quality matting approaches are computationally expensive and unable to provide responses in real time.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations disclosed herein provide a fast and efficient method for image matting. Some implementations use relatively large kernels or windows during matting processing. These implementations may employ larger kernels to propagate matting information more quickly than smaller kernels and can improve the matte quality. To further reduce computation time, some implementations may also employ adaptive kernel sizes based on trimap segmentation.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

FIGS. 9A-9H illustrate the effect of local-global-local processing according to some implementations.

DETAILED DESCRIPTION

Fast Image Matting

Figure 1:
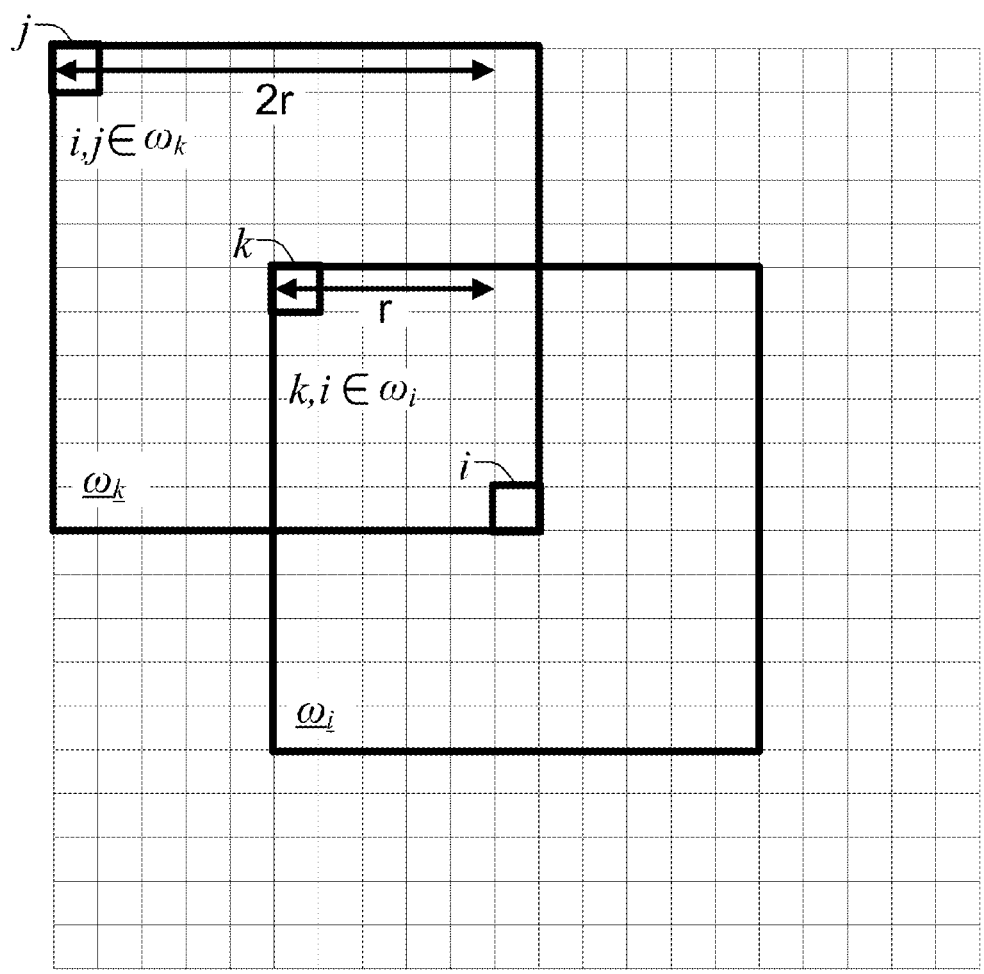
FIG. 1 illustrates an example of a kernel according to some implementations herein.

The technologies described herein are generally directed towards image matting to enable separation of a foreground portion of an image from a background portion of the image. For example, a foreground object can be lifted or pulled from an input image and then placed over a background provided by another image. Implementations herein may be applied to natural image matting in which the background is difficult to distinguish from the foreground being extracted. For instance, some implementations may be applied when the boundary between the foreground and the background is a soft boundary, such as is produced when hair or other complex structures extend in the boundary region between portions of the image that are clearly the foreground and clearly the background. Further, some implementations herein for image matting may be employed in a variety of applications, such as image/video segmentation, layer extraction, new view synthesis, interactive image editing, and film making, to name a few.

Since the matting problem is highly ill-posed, in some implementations, a trimap (or strokes) indicating definite foreground, definite background, and unknown regions may be provided by a user or an application. Efficiency is also a consideration for image matting, especially when applied to large multi-megapixel images produced by conventional digital cameras Implementations herein are able to quickly and efficiently infer the alpha matte in the unknown regions of an image, and are able to handle complex cases like hair. Some implementations can be applied to interactive image matting in which the matte is formed in real time as a user indicates regions of the trimap on a display.

Some implementations herein provide a technique for high quality image matting using relatively large-kernel matting Laplacian matrices that is substantially faster than conventional techniques. A Laplacian matrix (sometimes referred to as an admittance matrix) is a matrix representation of affinity between pixels based on color. Some implementations are based on an efficient method to solve a linear system using a large kernel matting Laplacian. Kernel size refers to the size of the portion of the image being processed, i.e., comprising a number of pixels around a pixel of interest. According to some implementations herein, using a relatively large kernel size accelerates the constraint propagation, reduces the time of the linear solver for convergence, and improves the matting quality. To further speed-up the matting process and reduce computation time, some implementations employ a segmentation technique to decompose the trimap into sub-trimaps and to enable assigning an adaptive kernel size to each sub-trimap. Thus, the number of iterations can be fixed beforehand and the running time of the entire process can be essentially linear to the number of the unknown pixels. Testing has demonstrated that implementations herein may be 5 to 20 times faster than conventional techniques while achieving high matting quality. Implementations can also be useful for other applications employing the matting Laplacian, such as haze removal, spatially variant white balance, and intrinsic images.

Large Kernel Matting Laplacian

For a color image, the foreground F and the background B can be specified as color components together with an alpha channel matte $\alpha$. For example, in the red, green, blue (RGB) color model, the image may be expressed as a matrix, as follows:

$$\left\{ \begin{array}{ccc} & \alpha & \\ F_r & F_g & F_b \\ B_r & B_g & B_b \end{array} \right\}$$

An alpha channel has various uses, including, for example, masking objects, making them transparent, or adding specific color instructions. In the $\{\alpha, F, B\}$ matrix, the alpha channel is a matte that distinguishes the foreground and background in an RGB image. As described herein, a user may construct such a matrix for an image through a process referred to as matting, which aims to find an appropriate $\alpha$ and F. For example, in the alpha matte, an alpha value of 1 typically indicates a foreground region and an alpha value of 0 typically indicates a background region.

Image matting is inherently under-constrained because the matting equation has too many unknowns. Therefore, user interaction is often used to obtain a quality matte. For example, in natural image matting, a user may supply a trimap that partitions the image into three regions: "definitely foreground", "definitely background" and "unknown region". The unknown region is typically the boundary between the definite foreground and definite background. In some implementations, the user may identify definite foreground and/or definite background using various interfaces and input devices. For example, a user may use a mouse or other input device to make one or more strokes, scribbles or clicks on an image to indicate a foreground portion and/or a background portion of an image. Further, in some implementations, the trimap may be partially or entirely automatically generated. For example, a user may positively identify a part of a foreground and a part of a background, with a trimap being automatically generated based on this identification. In some implementations, the user may use the input device to positively identify the unknown region or boundary. In other implementations, a trimap may be automatically generated based on a previous image in a sequence of images, such through motion estimation. Other variations will also be apparent in light of the disclosure herein.

For each pixel in an input image having a foreground color (F), a background color (B), and a foreground opacity (alpha matte $\alpha$), the pixel's color I can be expressed as a convex or linear combination of the foreground and background colors as follows:

$$I = F\alpha + B(1-\alpha) \tag{1}$$

The matting Laplacian matrix is an affinity matrix applicable to image matting. One assumption of Laplacian matting is the color line model, namely, the foreground (or background) colors in a local window lie on a single line in the RGB color space. That $\alpha$ is a linear transformation of I in the local window is proved by the following equation:

$$\alpha_i = a^T I_i b, \forall i \in \omega, \tag{2}$$

where i is a pixel index, $I_i$ and a are 3×1 vectors, $a^T$ is the transpose of vector a, and a and b are assumed to be constant in the local window $\omega$, in which a=1/F−B', and b=B/F−B'. Accordingly, a cost function $J(\alpha, a, b)$ can be defined to support the alpha obeying this model:

$$J(\alpha, a, b) = \sum_{k \in I} \left( \sum_{i \in \omega_k} (\alpha_i - a_k^T I_i - b_k)^2 + \varepsilon a_k^T a_k \right) \tag{3}$$

where $\omega_k$ is the window centered at pixel k, and $\epsilon$ is a regularization parameter. By minimizing the cost function with respect to (a, b), a quadratic function of $\alpha$ can be obtained:

$$J(\alpha) = \alpha^T L \alpha. \tag{4}$$

Here $\alpha$ is denoted as an N×1 vector, where N is the number of unknowns, and the matrix L is called the "matting Laplacian". The Laplacian matrix L is an N×N symmetric matrix whose (i, j) element may be expressed as:

$$L(i, j) = \sum_{k|(i,j) \in \omega_k} \left( \delta_{ij} - \frac{1}{|\omega_k|} \left( 1 + (I_i - \mu_k)^T \left( \sum_k + \frac{\varepsilon}{|\omega_k|} U \right)^{-1} (I_j - \mu_k) \right) \right) \tag{5}$$

where i j is the Kronecker delta, $\mu_k$ and $\Sigma_k$ are the mean and covariance matrix, respectively, of the colors in window $\omega_k$, $|\omega_k|$ is the number of pixels in the window $\omega_k$, and U is a 3×3 identity matrix.

Combining this cost function with the user-specified constraints (e.g., the trimap), the whole cost function may be defined as:

$$E(\alpha) = \alpha^T L \alpha + \lambda (\alpha - \beta)^T D (\alpha - \beta), \tag{6}$$

where $\beta$ is the trimap, D is a diagonal matrix whose elements are one for constraint pixels and zero otherwise, and $\lambda$, is a large number to enforce a hard constraint for the known pixels. A data term specified by color sampling confidence or a sparsity prior can also be incorporated in some implementations. The cost function of equation (6) can be optimized by solving a sparse linear system:

$$(L + \lambda D)\alpha = \lambda D \beta. \tag{7}$$

The techniques of haze removal, spatially variant white balance, and intrinsic images also involve this linear system. Given this linear system, implementations herein provide a matting component that uses an appropriate linear system solver to recover α, as described below. Non-iterative methods, such as LU (lower-upper) decomposition are typically not effective to handle this linear system in large scale due to the high memory cost. Further in conventional iterative methods, the information of the known pixels is propagated into the unknown region by iteratively multiplying the matrix. However, iterative methods are often time consuming, and another drawback of the iterative methods is that the time to carry out the computations is difficult to predict because the number of iterations depends on the number of unknowns, the image content, and the trimap shape. Thus, conventional iterative methods are typically not suitable for interactive image matting.

Further, conventional methods usually use a small window or kernel because the matrix will be less sparse with a larger window. Conventional thought holds that solving a less sparse system takes more time. However, according to some implementations herein, this is not necessarily true. Thus, according to some implementations herein, solving a less sparse system takes fewer iterations to converge, with the only bottleneck being the increased computational burden in each iteration. Thus, implementations herein are able to greatly reduce the time for each iteration, so the image matting component may actually be faster when a larger window or kernel is used.

FIG. 1 depicts a 21×21 pixel kernel 100 for discussion purposes, having a pixel i located at its center. The kernel size of a matting Laplacian is defined as the number of the non-zero elements in a row of L. In equation (5), the window radius of the window ω may be denoted by a "radius" r. Then the kernel size may be defined as $(4r+1)^2$. As set forth in equation (5), the (i, j) element of L is non-zero only if (i, j)∈$ω_k$. According to some implementations herein, as illustrated in FIG. 1, when the radius of the window ω is r, the radius of the kernel centered at i is 2r. Thus, kernel 100 includes a first window $ω_i$ of radius r having pixel i located at its center and a second window $ω_k$ having a pixel k located at its center. Both pixel i and pixel j are elements of window $ω_i$ and pixel i and pixel k are elements of window $ω_j$. Thus, pixel i is influenced by pixel j, which is 2r from pixel i.

Existing methods typically use r=1 (i.e., a 3×3 pixel window) because L will become less sparse when r is larger, and both the memory and the time to solve the linear system increases tremendously. For example, in the case of the conjugate gradient (CG) method for solving a linear system, the CG solver iteratively multiplies the conjugate vector by the Laplacian matrix. (See, e.g., Y. Saad, "Iterative methods for sparse linear systems," SIAM, 2003, page 178, for an example of a CG solver.) In each iteration, the matrix product Lp dominates the computation cost. Here p is the conjugate vector of the previous iteration. In the view of signal processing, the matrix product Lp is the response of a spatially variant filter L on p, whose ith element is:

$$(Lp)_i = \Sigma_j L_{ij} p_j. \quad (8)$$

Computing Lp using equations (5) and (8) involves spatially variant convolution, whose time and memory complexity is $O(Nr^2)$. This is not computationally affordable when r gets larger. However, according to implementations herein, in each iteration a pixel can influence another pixel that is 2r away. So the information is propagated according to 2r pixels. Consequently, the CG solver will converge in fewer iterations if the kernel size is larger.

Implementations herein may employ an O(N) time process (that is independent of r) to compute the product Lp in each iteration. Because the process is independent of r, the process is in some aspects independent of window size or kernel size, and thus, it becomes more efficient to process large sized kernels. Further, instead of computing L's elements and the convolution explicitly, implementations herein calculate the product Lp as a whole using equations (9), (10) and (11), as set forth below. Thus, according to implementations herein, given a conjugate vector p, Lp can be calculated through the following three equations:

$$a_k^* = \Delta_k^{-1}\left(\frac{1}{|\omega|}\sum_{i\in\omega_k} I_i p_i - \mu_k \overline{p}_k\right) \quad (9)$$

$$b_k^* = \overline{p}_k - a_k^{*T}\mu_k \quad (10)$$

$$(Lp)_i \equiv q_i = |\omega|p_i - \left(\left(\sum_{k\in\omega_i} a_k^*\right)^T I_i + \left(\sum_{k\in\omega_i} b_k^*\right)\right) \quad (11)$$

where $a_k^*$ is a 3×1 vector for each pixel k, $\overline{p}_k$ is the mean of p in $ω_k$, $$\Delta_k = \sum_k + \frac{\varepsilon}{|\omega_k|}U,$$

and $(Lp)_i$ is denoted as $q_i$. As mentioned above, equations (9)-(11) are independent of the window radius r, and therefore are independent of window or kernel size. Accordingly, some implementations herein carry out image matting based on the value q, given by equations (9), (10) and (11), being equivalent to the value Lp in the equations (5) and (8) discussed above. The theorem and proof for this equivalence are set forth below.

Theorem: The value q given by equations (9), (10) and (11) is identical to the value Lp calculated by equation (5) and equation (8) set forth above.

Proof: Written in matrix notation, from equation (9) there is an affine transform:

$$a^* = Ap, \quad (12)$$

where A is a coefficient matrix dependent on I. When equation (9) is combined with equation (10), it can be seen that b* is also p's affine transform: b*=Bp. Similarly, q is p's affine transform: q=Qp.

Consequently, in order to show q=Lp, it can be shown that $\partial q_i/\partial p_j = L(i, j)$. Putting equation (10) into equation (11) and eliminating b, provides:

$$\frac{\partial q_i}{\partial p_j} = |\omega|\delta_{ij} - \sum_{k\in\omega_i}\left(\frac{\partial \overline{p}_k}{\partial p_j} + \frac{\partial a_k^{*T}}{\partial p_j}(I_i - \mu_k)\right) \quad (13)$$

which provides:

$$\frac{\partial \overline{p}_k}{\partial p_j} = \frac{1}{|\omega|}\sum_{n\in\omega_k}\frac{\partial p_n}{\partial p_j} = \frac{1}{|\omega|}\delta_{j\in\omega_k} = \frac{1}{|\omega|}\delta_{k\in\omega_j} \quad (14)$$

where $\delta_{j\in\omega_k}$ is 1 if j∈$ω_k$, and is 0 otherwise. Additionally, equation (9) provides:

$$\frac{\partial a_k}{\partial p_j} = \Delta_k^{-1}\left(\frac{1}{|\omega|}\sum_{i\in\omega_k}\frac{\partial p_i}{\partial p_j}I_i - \frac{\partial \overline{p}_k}{\partial p_j}\mu_k\right) \quad (15)$$

-continued $$= \Delta_k^{-1}\left(\frac{1}{|\omega|}I_j - \frac{1}{|\omega|}\mu_k\right)\delta_{k\in\omega_j}.$$

Putting equation (14) and equation (15) into equation (13) provides:

$$\frac{\partial q_i}{\partial p_j} = |\omega|\delta_{ij} - \frac{1}{|\omega|}\sum_{k\in\omega_i, k\in\omega_j}(1+(I_j-\mu_k)^T\Delta_k^{-1}(I_i-\mu_k)) \quad (10)$$

which is exactly L(i, j) in equation (5).

The process herein also has intuitive interpretations: Equations (9) and (10) are linear regression solutions and the regression model may be expressed as $p_i \approx a_k^{*T}I_i + b_k^*$, $\forall i \in \omega_k$. Further, equation (11) can be rewritten as:

$$(Lp)_i = \sum_{k\in\omega_i}(p_i - (a_k^{*T}I_i + b_k^*)) \quad (16)$$

where, for any pixel $I_i$, the term $(p_i-(a_k^{*T}I_i+b_k^*))$ is the error between $p_i$ and its linear prediction. As $I_i$ is involved in all the regression processes satisfying $k \in \omega_i$, equation (16) is the sum of errors in all windows around i.

All the summations in (9) and (11) can be very efficiently computed using an integral image technique (see, e.g., Crow, F. C., "Summed-area tables for texture mapping," SIGGRAPH, 1984). Using the integral image, the sum of any window can be obtained in constant time (e.g., four operations). For example, once a summed area table has been computed for an image, any rectangle can be evaluated in constant time with just four array references. Therefore, the time complexity for computing Lp in each iteration is O(N') ≈O(N), where N' is the size of the bounding box of the unknown region. Consequently, it may be seen that the time complexity is also independent of the kernel size.

Example Framework

Figure 2:
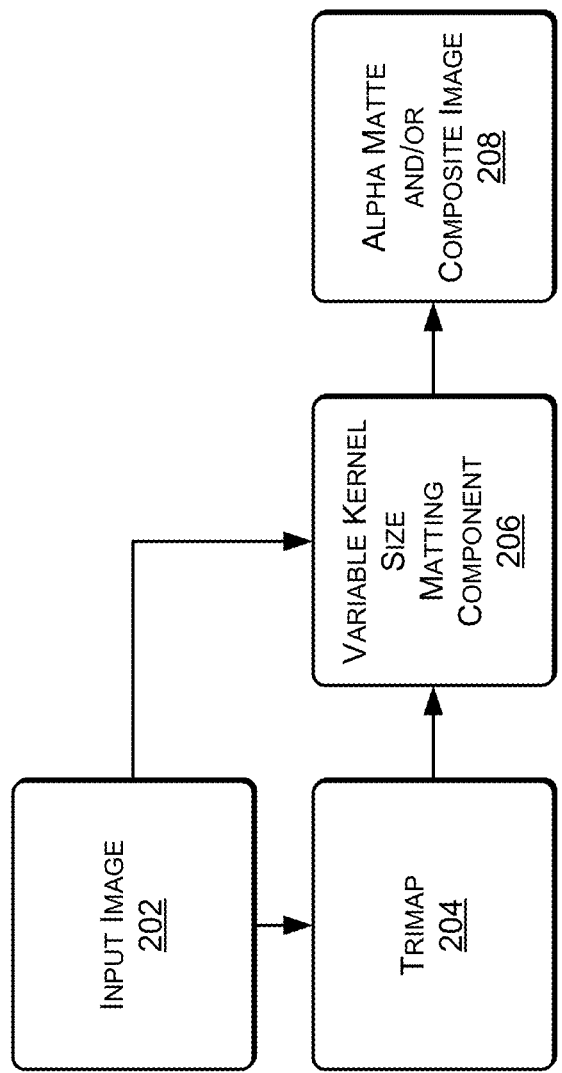
FIG. 2 is a block diagram of a framework for image matting according to some implementations.

FIG. 2 illustrates an example of a framework 200 for image matting according to some implementations herein. The framework 200 receives an input image 202 for processing. As an example, the input image 202 may have one or more foreground objects that a user would like to pull from the input image 202, such as for placing over a background of another image (not shown), or the like. The input image 202 may be used to generate a trimap 204 that is provided to a variable kernel size matting component 206. For example, in some implementations, a user may generate the trimap from the image interactively, such as by using a mouse and a user interface (not shown in FIG. 2) to designate a definite foreground region, a definite background region, and a boundary or unknown region. In other implementations, the trimap may be generated automatically or partially automatically based on user input. In other implementations, the trimap may be generated in advance, such as by the user, by an application, or the like. For example, in the case of a series of video images the trimap may be generated automatically by an application, such as based on motion estimation from a previous frame, and so forth.

The trimap and the input image are provided to the variable kernel size matting component 206 to process the image using equations (9), (10) and (11), as described above, to produce an alpha matter and/or composite image 208. Thus, for each pixel i in the unknown region, the variable kernel size matting component 206 determines the value $q_i$ based on a conjugate vector p of a previous iteration. As mentioned above, because the computation is independent of the window radius r and the kernel size, relatively large kernel sizes (e.g., 5×5 pixels or larger) may be used for processing each pixel, thereby achieving a high quality matte with a shorter computation time that conventional techniques.

Figure 3A:
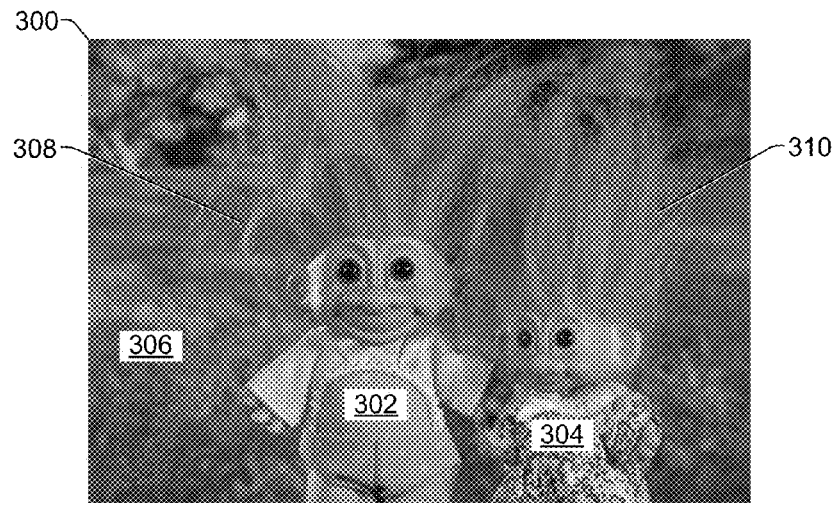
FIGS. 3A-3C depict an example of image matting according to some implementations.
Figure 3B:
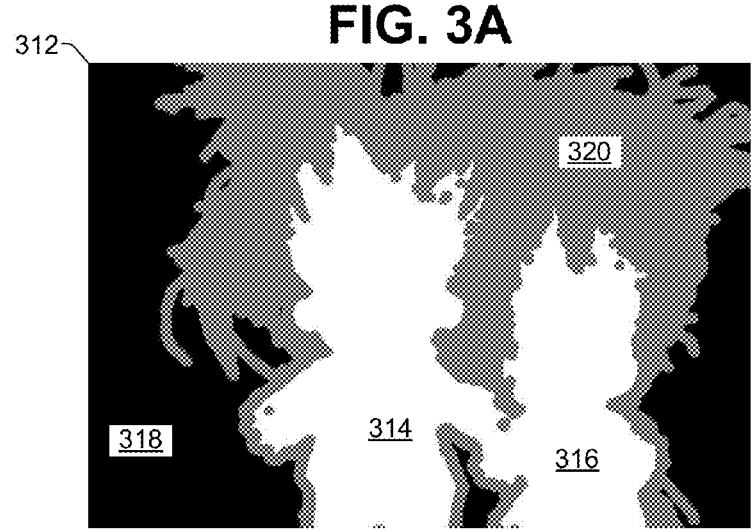
Figure 3C:
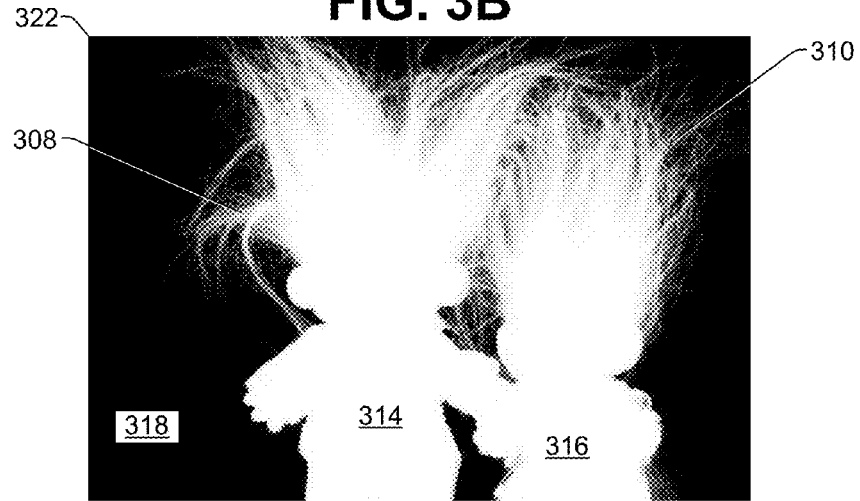

FIGS. 3A-3C depict an example of an input image 300 illustrating matting processing according to the framework of FIG. 2. As depicted in FIG. 3A, the input image 300 includes two dolls 302, 304 as foreground objects on a natural background 306. The dolls 302, 304 include hair 308, 310 that can be difficult to distinguish from the background 306. FIG. 3B is a trimap 312 corresponding to FIG. 3A, including definite foreground regions 314, 316, definite background regions 318 and a boundary or unknown region 320. A mentioned above, in some implementations the trimap may be generated interactively by a user, such as with a mouse or other input device. In other implementations, the trimap 312 may be generated automatically or semi-automatically, or generated in advance of receiving the input image 300. FIG. 3C depicts the alpha channel or alpha matte 322 extracted from input image 300 using an implementation of the matting process herein based on equations (9), (10) and (11) described above, that is independent of kernel size and window radius r. The process has clearly defined the details of the unknown region 320 of the trimap as either background 318 or foreground 314, 316, including the hair structure 308, 310.

Figure 4:
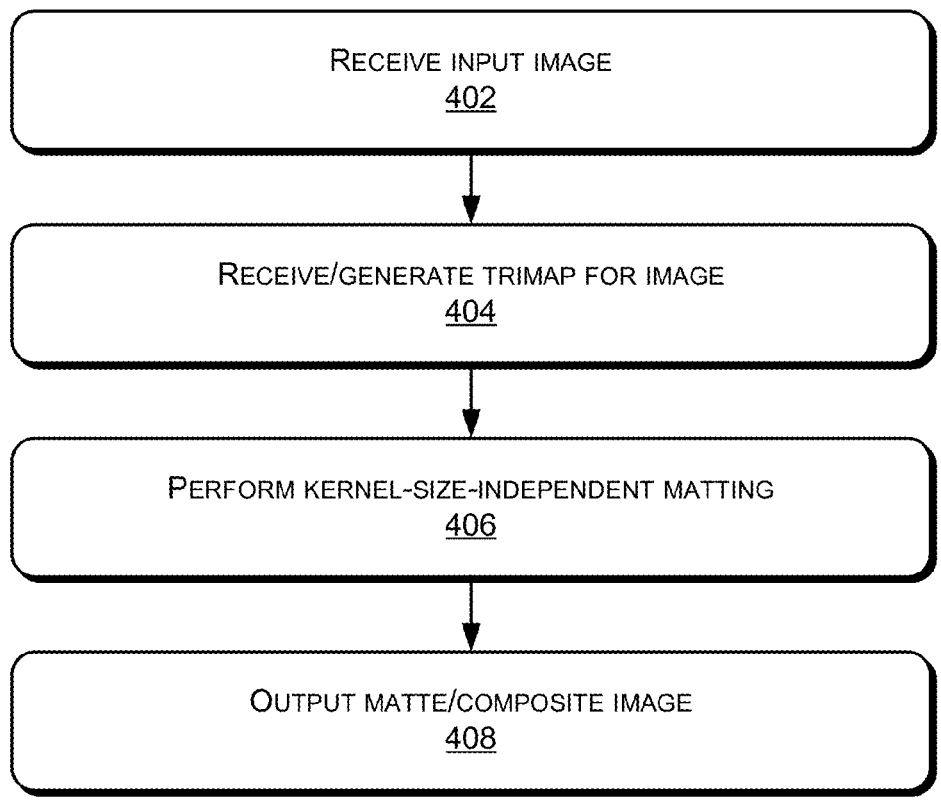
FIG. 4 is a flow diagram of an example process for image matting according to some implementations.

FIG. 4 depicts a flow diagram of an example process 400 for image matting according to some implementations herein. In the flow diagram, the operations are summarized in individual blocks. The operations may be performed in hardware, or as processor-executable instructions (software or firmware) that may be executed by one or more processors. Further, the process 400 may, but need not necessarily, be implemented using the framework of FIG. 2.

At block 402, an input image is received for processing. For example, the matting components and processing described herein may be part of a computer program application or software package such as an image processing application, a photograph editing application, a presentation application, a word processing application, a video editing application, or the like.

At block 404, a trimap corresponding to the input image is received or generated for the image. For example, as described above with reference to FIG. 3, the trimap identifies definite foreground areas, definite background areas, and an unknown boundary area.

At block 406, matting processing of the image is performed based on equations (9), (10) and (11) described above in a manner that is independent of the kernel size and window radius used during the processing. Thus, instead of computing the elements of the matting Laplacian L and the convolution explicitly, the product Lp is calculated as a whole using equations (9)-(11). Further, because the process is independent of kernel size a relatively large kernel size can be efficiently employed during the processing, thereby reducing the number of iterations carried out and increasing the speed of the overall process. The limits on the kernel size are discussed below and are based on maintaining the linearity of the system, rather than processing time, or the like.

At block 408, the alpha matte is generated as output. The alpha matte clearly indicates which parts of the input image are part of the selected foreground or part of the background. The alpha matte may be used for various applications, such as for transferring the selected foreground to a different background image to create composite image or for other purposes.

The above framework and process for image matting described herein may be implemented in a number of different environments and situations. Further, while several examples are described herein for explanation purposes, the disclosure is not limited to the specific examples, and can be extended to additional environments, applications and settings. For example, the matting processing herein may be used for other applications, such as haze removal, spatially variant white balance, intrinsic imaging, and the like.

Kernel Size

Figure 5:
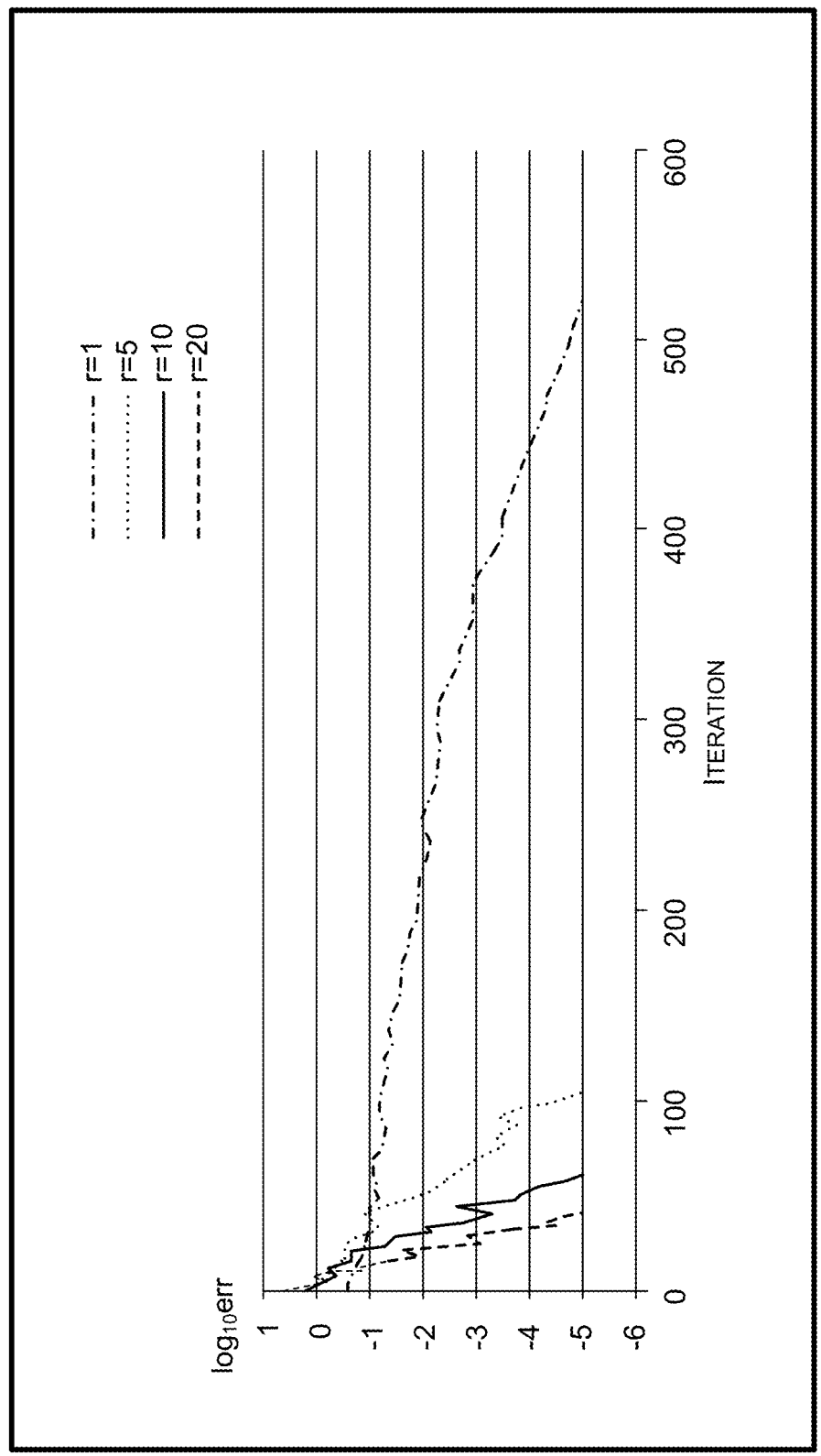
FIG. 5 is a graph illustrating examples of radius size relative to number of iterations to convergence according to some implementations.

FIG. 5 depicts a graph demonstrating the effect of different kernel sizes during processing on the same image according to implementations of the process described herein. As illustrated in FIG. 5, it may be seen that the solver converges much faster in the larger kernel cases. In this example, when the window radius r=1 the linear solver takes 519 iterations to converge, while when the window radius r=20, the solver only takes 44 iterations to converge, with the number of iterations for r=10 and r=5 also being substantially less than for r=1. Further, the running time (not shown in FIG. 5) is also substantially less for r=20 (e.g., 0.090 sec.) than for r=1 (e.g., 1.07 sec.), while the resulting mattes were visually almost identical. Consequently, by employing the above process, the running time of the linear solver can be substantially reduced when a relatively large kernel is used since the linear solver converges in fewer iterations. Further, as comparison with conventional techniques, the running time of a brute force CG solver using equations (5) and (8) for r=1 was found to be 0.95 sec. and for r=20 was found to be 22 sec.

A large kernel having a radius greater than r=1 can also improve the quality of the resulting matte because a large window may cover disconnected regions of the foreground/background. This property is particularly favored when the foreground object has holes through which portions of the background are visible. In such a case, when the radius is r=1, the radius may be too small to cover the known background and the holes. Thus, implementations herein can obtain a quality matte by using a larger window size, e.g., r=20. Further, the large kernel process herein may typically be more appropriate for high-resolution images. For example, a small window may not be sufficient to describe the fine lines or structures in an image, such as hairs, feathers, fuzz, etc., which can result in the loss of such fine structures. However, a large window enables collection of more color samples, and thereby achieves a higher quality result. Further, a larger window kernel also enables coverage of more known pixels near the boundary of unknowns and thereby provides more stable constraints. However, a drawback of a large kernel is that when the foreground/background is complicated, a larger window leads to a higher probability of breaking the color line assumption upon which equations (9)-(11) are based (i.e., equation (1)). For instance, if a window is so large that the window covers more than one color cluster of the background, the colors will not lie in the same line. Thus, an upper bound of the kernel size is limited based on maintaining linearity of the colors in the kernel. Consequently, the matte will not be as accurate as using a smaller window and may include artifacts. In practice, when creating a trimap, a user will create a wide band of unknowns near a fuzzy object or an object with holes, as it is difficult to provide a precise boundary, while, on the other hand, the band of unknowns created near a solid boundary tends to be relatively narrow. Further, the use of high-resolution images may also result in a wider band of unknowns. Accordingly, using a larger kernel enables efficient propagation of constraints in a wide band. However, for a narrow band, a smaller kernel may be favored to avoid breaking the color line assumption. To achieve this goal of using smaller kernels for narrower bands of unknowns and larger kernels for wider bands, implementations herein adaptively set the kernel size based on a trimap segmentation technique, as described below.

Example Framework with Trimap Segmentation

Figure 6:
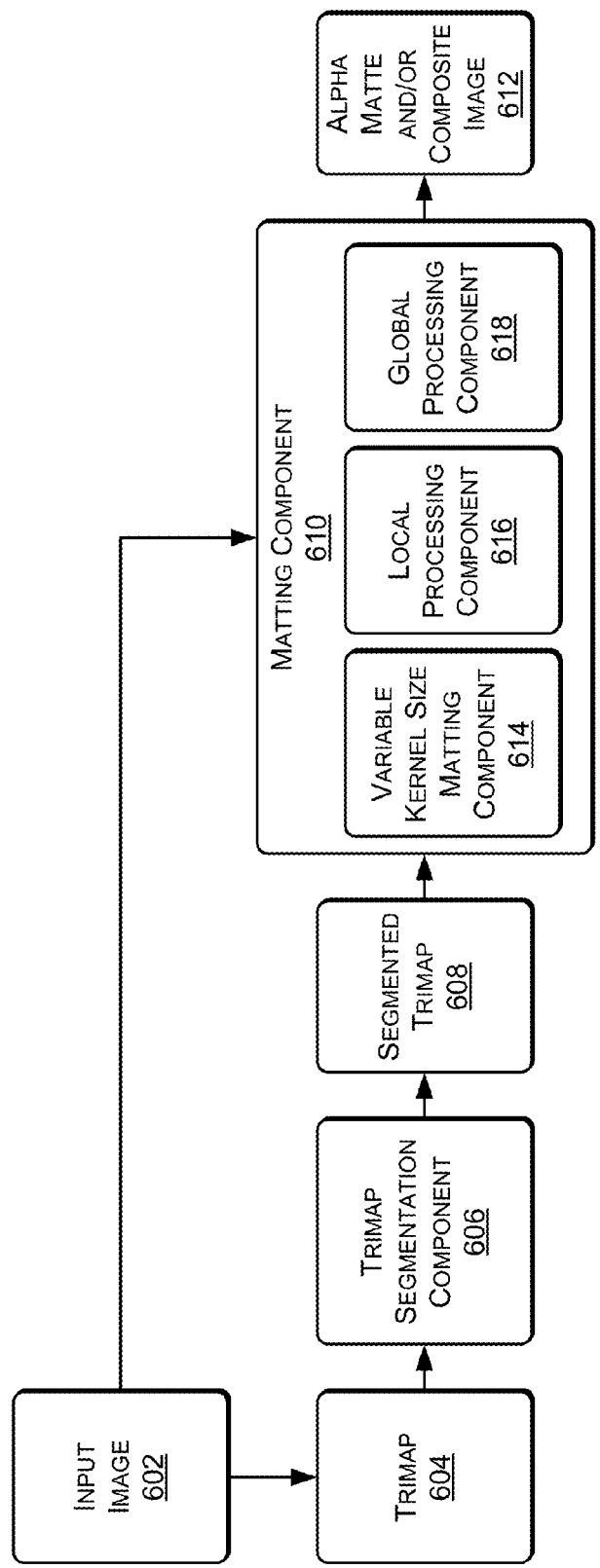
FIG. 6 is a block diagram of a framework for image matting with trimap segmentation according to some implementations.

FIG. 6 depicts an example of a framework 600 for image matting with trimap segmentation according to some implementations herein. The framework 600 receives an input image 602 for processing. As an example, the input image 602 may have one or more foreground objects that a user would like to pull from the input image 602, such as for placing over a background of another image (not shown), or the like. The input image 602 may be used to generate a trimap 604 or the trimap 604 may be received with the input image 602. For example, in some implementations, a user may generate the trimap interactively, such as by using a mouse and a user interface (not shown in FIG. 6) to designate a definite foreground region, a definite background region, and a boundary or unknown region. In other implementations, the trimap may be generated automatically or partially automatically based on user input. Further, the trimap 604 may be generated in advance, such as by the user, by an application, or the like.

The trimap 604 may be provided to a trimap segmentation component 606. Trimap segmentation component 606 performs segmentation of the trimap 604 to divide the trimap into smaller regions or segments to produce a segmented trimap 608. Through segmentation of the trimap, each segment can be processed individually using an optimal kernel size during the matting processing, as is described additionally below. The segmented trimap 608 and the input image 602 are provided to a matting component 610 to process the image to produce an alpha matte and/or composite image 612.

Matting component 610 may include a variable kernel size matting component 614 to perform the matting processing to separate the alpha matte from the background, as described above, based on formulas (9)-(11). In some implementations, variable kernel size matting component 614 corresponds to variable kernel size matting component 206 discussed above. Each segment in the segmented trimap may be processed using an optimal kernel size determined for the segment. As mentioned above, because the matting computation itself is independent of the kernel size, relatively large kernel sizes (e.g., 5×5 pixels or larger) may be used for processing each segment, thereby achieving a high quality matte with a shorter computation time that conventional techniques. Further, through trimap segmentation, the kernel size can be optimized to maintain linearity within each kernel.

Matting component 610 may further include a local processing component 616 and a global processing component 618. Local processing component 616 and global processing component 618 may be provided to address artifacts and seams that may otherwise occur in the alpha matte due to the segmentation of the trimap. Thus, as is described additionally below, according to some implementations, the matte may be calculated during a first local pass for each segment using local processing component 616. Global processing component 618 may then be used to refine the matte during a global pass that solves the unknowns based on the entire trimap to remove transitions between segments. Finally, the local processing component 616 may be employed again to further refine the matte during a second local pass that performs additional processing on each of the segments of the segmented trimap. Other variations will also be apparent in light of the disclosure herein.

Trimap Segmentation

According to some implementations herein, trimap segmentation may further improve both the quality and efficiency of the image matting. Trimap segmentation enables different window or kernel sizes to be used in different regions. Thus, trimap segmentation reduces a large linear system into a set of smaller linear systems and thereby further reduces the running time for solving the entire system.

Figure 7A:
FIGS. 7A-7B illustrate an example of trimap segmentation according to some implementations.
Figure 7B:
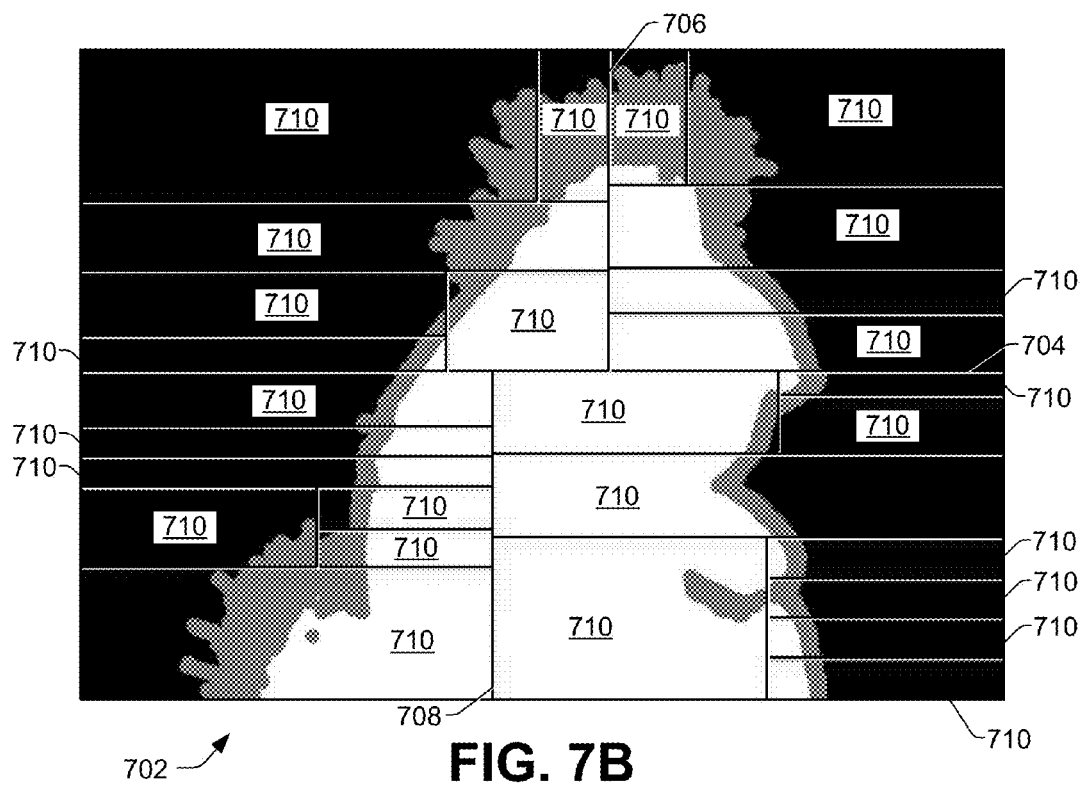

FIG. 7A illustrates an example input image 700, while FIG. 7B illustrates a corresponding trimap 702 for image 700. For a given trimap, implementations herein first calculate the unknown region's barycenter $(x_x, y_c)$, x variance $$\sigma_x^2 = \frac{1}{n}\sum_U (x_c - x)^2,$$

and y variance $$\sigma_y^2 = \frac{1}{n}\sum_U (y_c - y)^2,$$

where U is the set of unknown pixels, and n is the size of U. Then a line that passes through $(x_c, y_c)$ is used to divide the trimap into two areas. This line is perpendicular to the axis (either x or y) having a larger variance. For instance, in the illustrated example of FIG. 7B, the line 704 divides the trimap into two areas, these two areas are then divided into two more areas, by lines 706 and 708, respectively, each of those areas may be further divided into two more areas, and so forth, to divide the trimap 702 into a plurality of segments 710. Each segment 710 contains a portion of the unknown region and at least one of definite foreground region and definite background region. In some implementations, the trimap may be recursively divided and a two-dimensional tree data structure may be built accordingly. For example, in the tree data structure, the entire trimap serves as the root area and each time an area is subdivided into two sub-areas, two branches are added to the tree. Such a tree may be referred to as a binary space partitioning (BSP) tree or a two-dimensional k-dimensional (2D KD) tree. The tree data structure may be traversed for managing matting processing of the various segments of the trimap.

The conditions for stopping the recursive subdivision of the trimap may be determined as follows. If a subdivided area of the image covers enough foreground and background constraints, a reasonably good matte can be obtained by considering just this subdivided area of the image independently. Therefore, it is desirable for the segments to be small, while still having as many of segments as possible having both definite foreground (F) and definite background (B) constraints in addition to the unknown (U) region. Consequently, according to implementations herein, the recursive division of the trimap may be stopped when at least one of the following conditions is satisfied: (a) the segment only has F and U elements; (b) the segment only has B and U elements; (c) if the segment is divided, one of the segment's children will have only F and U elements, and the other child will have only B and U elements; or (d) The segment's minimum width or minimum height would be smaller than a predetermined threshold. Empirical data has shown 32 pixels to be a suitable threshold, although other suitable thresholds may also be used. It may be further noted that these conditions generally result in segmentation of the trimap such that the bandwidth of the unknowns in each segment is generally uniform.

According to some implementations, when the trimap has been segmented, the linear system in each segment can be solved as described above based on equations (9)-(11). The integral image is calculated in a bounding box of the unknowns in each segment. Implementations herein first solve the segments that satisfy the above conditions (c) or (d), as these segments directly contain both F and B constraints. Then, other segments (i.e., those segments that have only F and U, or only B and U) are solved, such as by using an inverse Breadth-First Search order on the tree data structure, i.e., in which the deeper leaves in the binary tree have a higher priority. Further, because these remaining segments do not contain one of an F or B constraint, implementations herein use an already-solved matte of a neighboring segment as boundary conditions. The inverse Breadth-First Search order ensures that at least one of the neighboring segments has already been solved, although other methods may also be used for determining an order to solve the various segments.

In addition, implementations herein adapt the kernel size used to solve each segment to the bandwidth of the unknowns in that segment. For example, for each segment, let (w, h) be the width and height of U's bounding box (i.e., a rectangle of a minimum size that encompasses all the unknown pixels in the particular segment). Implementations herein approximate the width of the band by $w_b=n/\max(w,h)$. Implementations herein set the window radius $r=w_b/\eta$, where $\eta$ is a factor that may be determined empirically. For example, experiments with implementations herein have shown suitable values for $\eta$ to range from 2 to 20, depending on desired window size. Intuitively, the propagation will influence the other side of the band in $\eta/2$ iterations (noting that the kernel radius is 2r). Therefore, the number of iterations for convergence is in the order of $\eta$, and can be fixed beforehand. For example, if the bandwidth of the unknown region of a first segment is approximately 50 pixels, i.e., $w_b$=50, then using a factor $\eta$ of 3, the window radius r=50/3 or 17 for processing the first segment (i.e., a kernel size of 69×69 pixels). On the other hand, when the bandwidth of a second segment is approximately 30 pixels, then the window radius r=10 for that segment (i.e., a kernel size of 41×41 pixels). Thus, implementations herein are able to assign a kernel size that is suitable for the particular segment for maintaining both a linear system and for achieving optimal processing speed. Consequently, the propagation speed is adaptive to the bandwidth of the unknown region in a particular segment. Further, the same number of iterations is able to provide high quality mattes for two bands of unknowns of different width.

Figure 8:
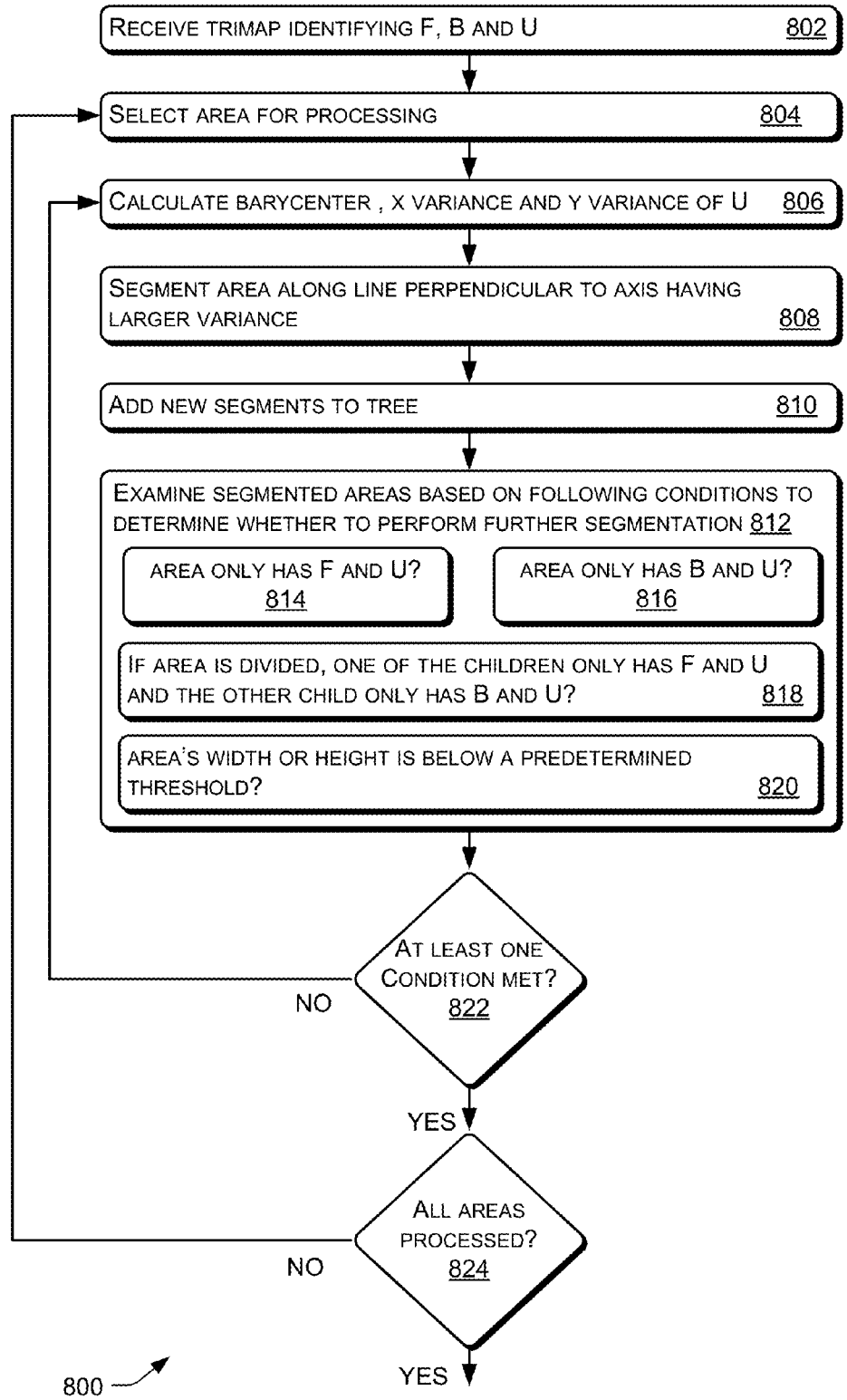
FIG. 8 is a flow diagram of an example process for trimap segmentation according to some implementations.

FIG. 8 depicts a flow diagram of an example process 800 for trimap segmentation according to some implementations herein. In the flow diagram, the operations are summarized in individual blocks. The operations may be performed in hardware, or as processor-executable instructions (software or firmware) that may be executed by one or more processors. Further, the process 800 may, but need not necessarily, be implemented using the framework of FIG. 6.

At block 802, a trimap of an image is received identifying a definite foreground portion F, a definite background portion B and a boundary or unknown portion U.

At block 804, the process selects an area of the trimap for processing. For example, when the trimap is first received the entire trimap is the area that is processed, whereas, subsequently, subdivided areas of the trimap are the areas selected for processing.

At block 806, the barycenter, x variance, and y variance are calculated for the unknown portion U of the selected area.

At block 808, the area may be segmented at the barycenter along a line perpendicular to the axis having the larger variance.

At block 810, the two new segments created by segmenting the selected area are added to the tree data structure representing the trimap segmentation. As mentioned above, the tree data structure may be a BSP or 2D KD tree.

At block 812, the two new segmented areas are examined based upon specified conditions to determine whether to perform further segmentation on one or both of the segmented areas. Thus for each of the new segmented areas, the process determines whether at least one of the four following conditions has been met.

At block 814, the process determines whether the segmented area has only foreground F and unknown U elements.

At block 816, the process determines whether the segmented area has only background B and unknown U elements.

At block 818, the process determines whether, if the segmented area is divided, one of the children will have only foreground F and unknown U elements while the other child will have only background B and unknown U elements.

At block 820, the process determines whether the segmented area's width or height is below a predetermined threshold. As mentioned above, and this predetermined threshold may be determined experimentally. Implementations herein have shown that the threshold may be between 25 and 40 pixels, such as for example 32 pixels, although other threshold values may also be used.

At block 822, the process determines whether one or more of the above conditions have been met. If not, then the process returns to block 806 to process the area for which none of the conditions have been met. On the other hand, if at least one of the conditions is met for both of the newly segmented areas, then no further segmentations of these areas is desired and the process moves to block 824.

At block 824, the process determines whether all of the areas in the trimap have been processed. When all of the areas in the trimap have been segmented, the segmented trimap is ready for image matting processing.

Local-Global-Local Processing

To prevent the result from being overly locally determined, some implementations herein employ a local-global-local (LGL) scheme. Under this LGL scheme, following the trimap segmentation technique described above, a first local pass is performed which quickly solves the matte for each segment in the segmented trimap. Next a global pass is performed over the entire unsegmented trimap, and then a second local pass is performed over the segmented trimap to further refine the alpha matte.

Figure 9E:
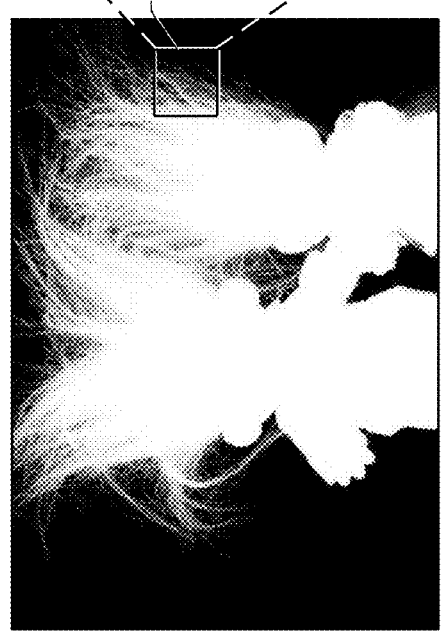
Figure 9F:
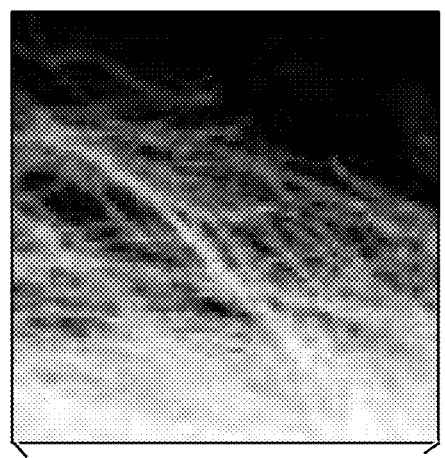

FIGS. 9A-9H depict an example of the execution and effect of the local-global-local processing scheme. FIG. 9A depicts a trimap 900 corresponding to the trimap 312 of FIG. 3B. The trimap 900 has been segmented using the trimap segmentation technique described above. Initially, a first local pass of the image is performed for each segment in the trimap 900 to generate an alpha matte 902, as depicted in FIG. 9C. For example, if $\eta=3$, then the matting component is able to quickly propagate initial matting information. Further, some implementations herein may empirically fix the number of iterations in the first local pass. For example, experiments have shown that 10 iterations is a suitable number of iterations for the first local pass sufficient to obtain a good initial alpha matte 902.

However, because the segments are processed individually to a certain extent, noticeable seams may exist on segment boundaries. FIG. 9B represents an enlarged region 904 of a segment boundary line 906 between a first segment 908 and a second segment 910. FIG. 9D represents an enlarged region 912 of alpha matte 902 corresponding to the location of enlarged region 904 of FIGS. 9A-9B. Close examination of the corresponding alpha matte 902 at the enlarged region 912 in area 914 reveals a noticeable transition between the two segments 908, 910 at the location of the segment boundary line 906.

Using the above-obtained alpha matte 902 as an initial guess, some implementations herein next optimize the whole linear system globally. Accordingly, for the global matting process, in some implementations, the window radius r is set to be min(w, h)/50 where w and h are the image's width and height in pixels, and 50 is an empirically determined value, although other suitable values may also be used. Further, the number of iterations to be carried out is fixed on a low number, such as five. This global processing produces a second alpha matte 916, as illustrated in FIG. 9E. As demonstrated by the enlarged area 918, of FIG. 9F, the noticeable transition between the segments is eliminated by the global processing.

Figure 9G:
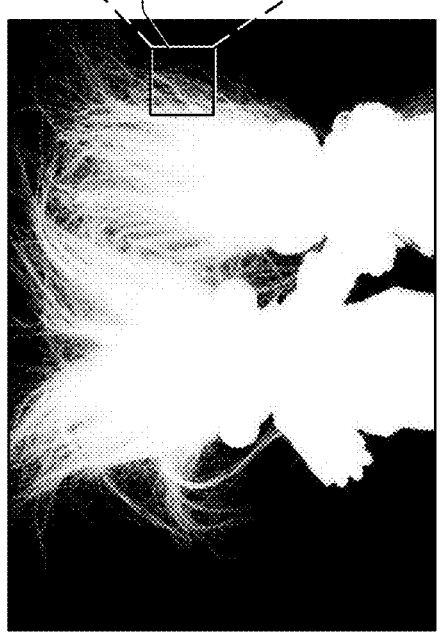
Figure 9H:
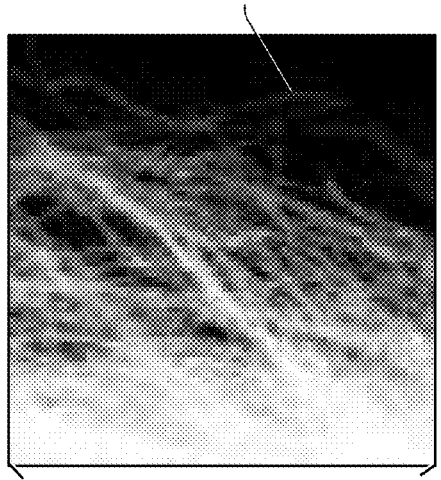

However, the kernel size used in the global processing may be too large for some local regions. Thus, because of the large kernel size, the alpha matte 916 may include artifacts or be missing some details due to the failure of the color line assumption. Consequently a second local processing pass may be executed to further refine the alpha matte 916 using the segmented trimap 900. As an example, in the second local pass, $\eta$ may be larger than in the earlier passes, such as $\eta=15$ and the number of iterations permitted may also be larger, such as 20 iterations. Experiments have shown that more iterations than 20 improve the result very little. Additionally, because $\eta$ is larger (i.e., 15 as opposed to 3), the window and kernel size is much smaller in the second local pass than in the first local pass so as to ensure that the color line model is maintained. This suppresses the occurrence of artifacts due to the large window size used in previous two steps, and can produce a third alpha matte 920, as illustrated in FIG. 9G. FIG. 9H depicts an enlarged portion 922 of alpha matte 920, showing that artifacts are eliminated and some details 924 are improved.

Time Complexity

The running time of implementations herein may be substantially linear to the image size thereby providing predictable performance and processing time based on image size. For example, if N' is denoted as the total area of all the bounding boxes of the unknowns in all segments, then the time complexity of the local steps is O(N') when the time for calculating Lp in each iteration is O(N') and the iteration number is fixed. For the same reason, the time complexity of the global step is O(M), where M is the size of the bounding box of the whole unknown region. Experiments have shown that the time for the global step is much less than that of the local steps due to the fewer number of iterations. Consequently, the total time complexity is essentially O(N'). Therefore, as N' is slightly larger than the number of unknowns N, the running time is almost linear to N. Accordingly, after the trimap is segmented, the time can be predicted based in the number of unknown pixels N before running the linear solver.

Example Matting Process with Trimap Segmentation

Figure 10:
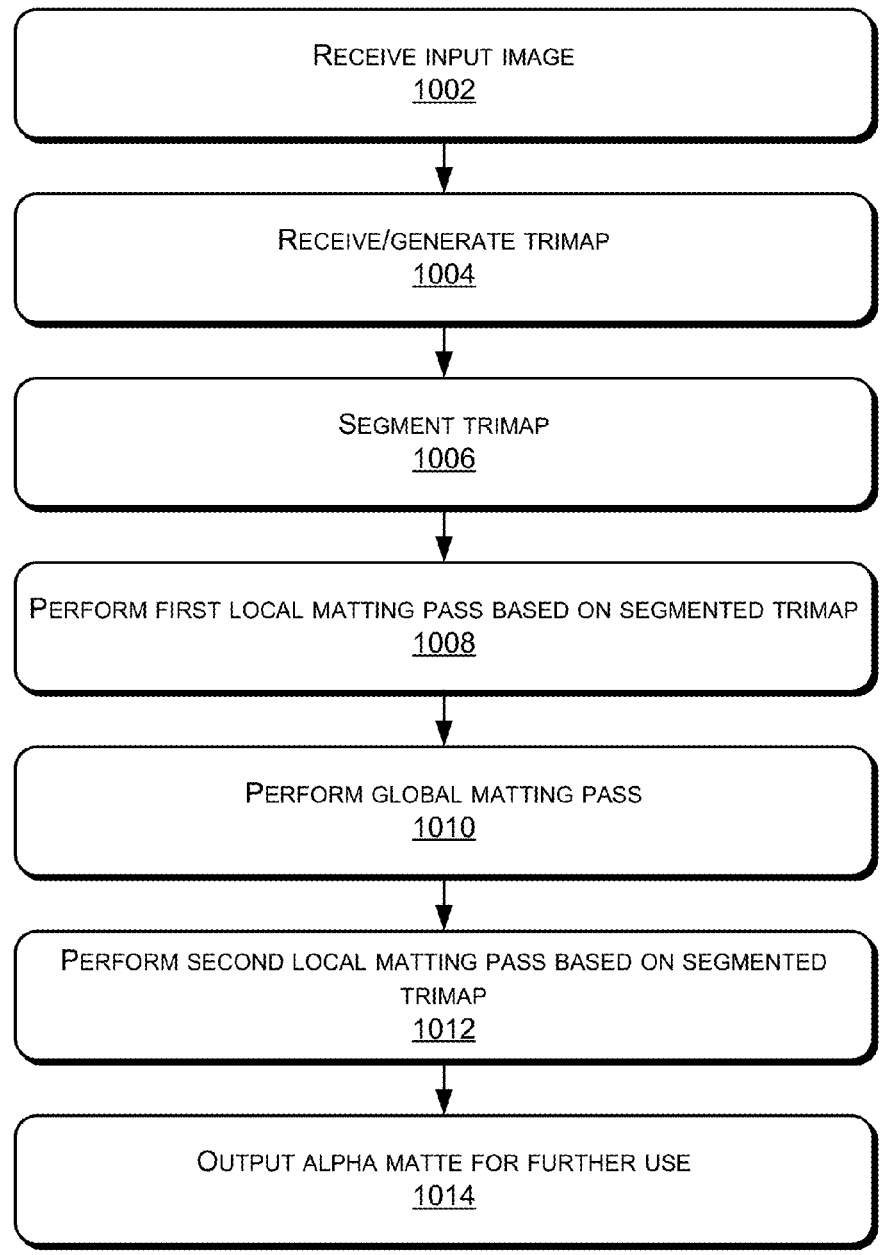
FIG. 10 is a flow diagram of an example process for image matting with trimap segmentation and local-global-local processing according to some implementations.

FIG. 10 depicts a flow diagram of an example of a matting process 1000 with trimap segmentation according to some implementations herein. In the flow diagram, the operations are summarized in individual blocks. The operations may be performed in hardware, or as processor-executable instructions (software or firmware) that may be executed by one or more processors. Further, the process 1000 may, but need not necessarily, be implemented using the framework of FIG. 6.

At block 1002, an input image is received for processing. For example, in some implementations, a high-resolution image having a foreground object on a natural background is received for pulling the foreground object and an alpha matte from the background of the image.

At block 1004, a trimap is received and/or generated for the input image. For example, in some implementations, a user may interactively assist in generation of the trimap using a user interface and an input device, such as a mouse. In other implementations, the trimap may be pre-generated by a user or an application, or provided by other methods.

At block 1006, the trimap is segmented as described above with reference to FIG. 8. For example, the trimap is segmented and a corresponding tree data structure is generated to enable traversal of the trimap segments during matting processing of the individual segments. Other methods of performing matting processing of the individual segments may also be used.

At block 1008, a first local matting processing pass is performed based on the segmented trimap. For example, this local pass may be a quick processing of the image using a low number of iterations and larger kernel sizes to obtain a first alpha matte.

At block 1010, a global matting processing pass is performed on the image based on the trimap without considering the segmentation. For example, the global pass may also be performed using a large kernel size and a relatively small number of iterations to refine the first alpha matte by removing transition areas between segments to obtain a second alpha matte.

At block 1012, a second local matting processing pass is performed based on the segmented trimap to further refine the second alpha matte. The second local pass may be performed using a smaller kernel size and a larger number of iterations than the first local pass for refining the second alpha matte to obtain a third alpha matte.

At block 1014, the third alpha matte is output, and may be used for further image processing. For example, the third alpha matte may be used to place the corresponding foreground object over a new background to create a composite image, or the like.

Computing System Environment

Figure 11:
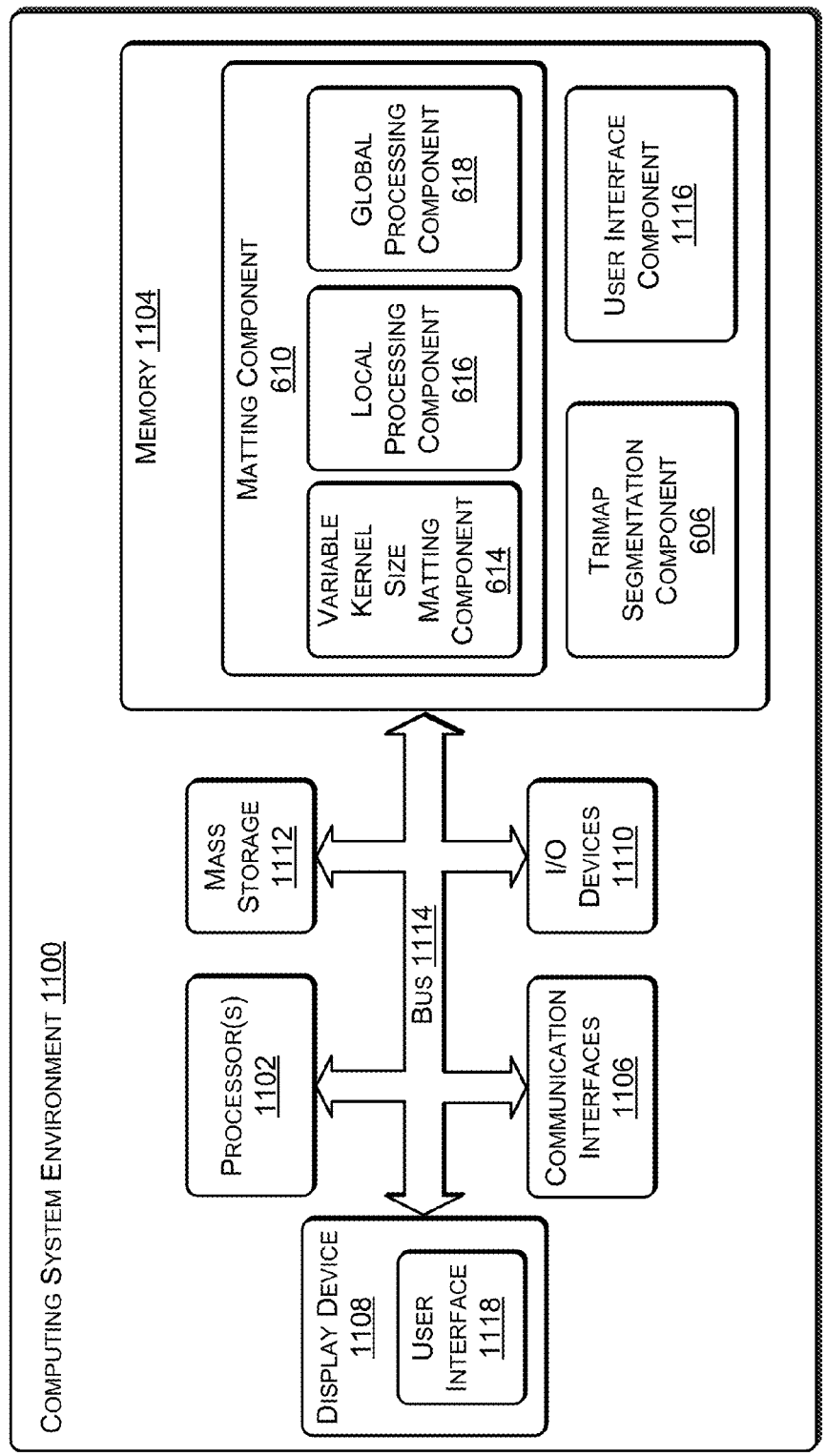
FIG. 11 is a block diagram of an example of a suitable computing system environment according to some implementations.

FIG. 11 illustrates an example configuration of a suitable computing system environment 1100 according to some implementations herein. The computing system environment 1100 may include at least one processor 1102, a memory 1104, communication interfaces 1106, a display device 1108, input/output (I/O) devices 1110, and one or more mass storage devices 1112, all able to communicate through a system bus 1114 or other suitable connection.

The processor 1102 may be a single processing unit or a number of processing units, all of which may include single or multiple computing units or multiple cores. The processor 1102 can be implemented as one or more microprocessors, microcomputers, microcontrollers, digital signal processors, central processing units, state machines, logic circuitries, and/or any devices that manipulate signals based on operational instructions. Among other capabilities, the processor 1102 can be configured to fetch and execute computer-readable instructions or processor-accessible instructions stored in the memory 1104, mass storage devices 1112, or other computer-readable storage media.

Memory 1104 and mass storage devices 1112 are examples of computer-readable storage media for storing instructions which are executed by the processor 1102 to perform the various functions described above. For example, memory 1104 may generally include both volatile memory and non-volatile memory (e.g., RAM, ROM, or the like). Further, mass storage devices 1112 may generally include hard disk drives, solid-state drives, removable media, including external and removable drives, memory cards, Flash memory, floppy disks, optical disks (e.g., CD, DVD), storage arrays, storage area networks, network attached storage, or the like, or any combination thereof. Both memory 1104 and mass storage devices 1112 may be collectively referred to as memory or computer-readable storage media herein. Memory 1104 is capable of storing computer-readable, processor-executable program instructions as computer program code that can be executed on the processor 1102 as a particular machine configured for carrying out the operations and functions described in the implementations herein. Memory 1104 may include the trimap segmentation component 606 and the matting component 610 having the variable kernel size matting component 614, the local processing component 616, and the global processing component 618, which can be executed on the processor 1102 for implementing the functions described herein. In some implementations, memory 1104 may include a user interface component 1116 for generating a user interface 1118 on display device 1108. User interface 1118 may enable a user to interactively use matting component 610 for pulling a matte from an image. For example, the user may use a mouse or other input device 1110 to interact with an image such as for generating a trimap of the image being processed. In some implementations, matting component 610 and trimap segmentation component 606 may be part of an application (not shown), or the like, such as any of an image processing application, a photo editing application, a presentation generating application, a word processing application, or any other suitable application. Further in other implementations, matting component 610 and trimap segmentation component 606 are separate components not included in an application, and/or may be part of an operating system (not shown).

The computing system environment 1100 can also include one or more communication interfaces 1106 for exchanging data with other devices, such as via a network, direct connection, or the like, as discussed above. The communication interfaces 1106 can facilitate communications within a wide variety of networks and protocol types, including wired networks (e.g., LAN, cable, etc.) and wireless networks (e.g., WLAN, cellular, satellite, etc.), the Internet and the like.

The display device 1108, such as a monitor, display, or screen, may be included in some implementations for displaying the user interface 1118 and/or an input image to a user. I/O devices 1110 may include devices that receive various inputs from a user and provide various outputs to the user, such as a keyboard, remote controller, a mouse, a camera, audio devices, and so forth.

The example environments, systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or applications, and may be implemented in general purpose and special-purpose computing systems, or other devices having processing capability.

Additionally, the components, frameworks and processes herein can be employed in many different environments and situations. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer-readable storage devices. Thus, the processes, components and modules described herein may be implemented by a computer program product.

Although illustrated in FIG. 11 as being stored in memory 1104 of computing system environment 1100, matting component 610, trimap segmentation component 606, or portions thereof, may be implemented using any form of computer-readable media that is accessible by computing system environment 1100. Computer-readable media may include, for example, computer storage media and communications media.

Computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

In contrast, communication media may embody computer readable instructions, data structures, program modules, or other data in a modulated data signal, such as a carrier wave, or other transport mechanism.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Implementations herein provide fast and efficient image matting. Further, implementations enable matting processing using relatively large or optimized kernel sizes. Employing larger and optimized kernels leads to fewer iterations to converge, enabling the focus to be on reducing the time in each iteration, and can also provide mattes of improved quality.

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method comprising:
receiving a trimap of an image that specifies a foreground region, a background region and an unknown region for the image;
segmenting the trimap into a plurality of segments, each segment including a portion of the unknown region and at least one of a portion of the foreground region or a portion of the background region;
solving, by a processor, the portion of the unknown region in each segment in a first local pass to provide a first alpha matte that distinguishes a foreground region from a background region in the portion of the unknown region;
solving, by the processor, the unknown region for the entire image as a linear system to refine the first alpha matte to obtain a second alpha matte; and
refining the second alpha matte to obtain a third alpha matte by solving the portion of the unknown region in each segment wherein the solving for each segment employs a kernel size based on a size of the unknown region of the segment that is smaller than a kernel size used in the first local pass.

2. The method according to claim 1, further comprising segmenting the trimap by:
calculating a barycenter of unknown elements for a selected area; and
segmenting the selected area along a line perpendicular to one of an x axis or a y axis having a larger variance of the unknown elements.

3. The method according to claim 2, further comprising performing segmentation of the selected area of the trimap until at least one of the following conditions is met:
the selected area contains only foreground and unknown elements;
the selected area contains only background and unknown elements;
if the selected area is divided, one of the subdivided areas would only have foreground and unknown elements, and another of the subdivided areas would only have background and unknown elements; or
a width or height of the selected area is below a predetermined threshold.

4. The method according to claim 1, wherein an upper bound of the kernel size is limited based on maintaining linearity of the colors in the kernel.

5. The method according to claim 1, wherein solving the portion of the unknown region for each segment comprises employing a relatively larger kernel size when a size of the portion of the unknown region in the segment is relatively wide and employing a relatively smaller kernel size when the size of the portion of the unknown region in the segment is relatively narrow.

6. A method comprising:
receiving a trimap of an image, the trimap specifying a foreground region, a background region and an unknown region;
segmenting the trimap into a plurality of segments, the segmenting comprising:
calculating a barycenter of unknown elements for a selected area; and
segmenting the selected area along a line perpendicular to one of an x axis or a y axis having a larger variance of the unknown elements;

selecting a kernel size for performing matting processing; and performing the matting processing using the selected kernel size to provide an alpha matte that distinguishes a foreground portion from a background portion in the unknown region, wherein the matting processing includes calculating a product of a conjugate vector and a Laplacian matrix as a whole based on an integral image technique.

7. The method according to claim 6, wherein selecting the kernel size comprises specifying a window radius for the matting processing.

8. The method according to claim 6, wherein the matting processing is time independent of the selected kernel size.

9. The method according to claim 6, further comprising:
selecting a kernel size for each segment based on the size of the unknown region in each segment, wherein larger kernel sizes are selected for larger unknown regions and smaller kernel sizes are selected for smaller unknown regions.

10. The method according to claim 9, wherein performing the matting processing using the selected kernel size comprises performing the matting processing for each segment using the kernel size selected for that segment based on the size of the unknown region in that segment.

11. The method according to claim 10, further comprising performing a second matting processing of the image as a whole to smooth transition areas between segments in the alpha matte.

12. The method according to claim 9, wherein the trimap is segmented based on one of a binary space partitioning tree segmentation method or a two-dimensional KD tree based segmentation method.

13. The method according to claim 6, wherein, the kernel size is selected relative to a size of the unknown region.

14. A system comprising:
a processor in communication with computer-readable storage media;
a trimap segmentation component, maintained in the computer-readable storage media and executed on the processor, to receive a trimap of an image that defines a specified foreground region, a background region and the unknown region, the trimap segmentation component segmenting the trimap into a plurality of segments, each segment including a portion of the unknown region; and
a matting component to solve the unknown region of the image by solving the portion of the unknown region of each segment to provide an alpha matte that distinguishes foreground elements from background elements in the unknown region, wherein the matting component includes a local processing component that performs a first pass of the image by solving, for each segment, the portion of the unknown region of each segment using a window having a radius selected based on a size of the portion of the unknown region of each segment.

15. The system according to claim 14, wherein:
the matting component further includes a global processing component that solves the unknown region of the entire image; and
the local processing component subsequently performs a second pass of the image based on the segmentation to solve the portion of the unknown region of each segment based on the results of the global processing component.

16. The system according to claim 15, wherein the second pass performed by the local processing component is performed using a smaller window radius and/or more iterations for each segment than during the first pass by the local processing component.

17. The system according to claim 14, wherein
the matting component first solves one or more first segments having a portion of the foreground region, a portion of the background region and a portion of the unknown region, and subsequently solves one or more second segments having a portion of the unknown region and only one of a portion of the foreground region or a portion of the background region; and
the one or more second segments are solved using an adjacent previously-solved segment.

* * * * *